(12) United States Patent
Mikami

(10) Patent No.: US 7,164,628 B2
(45) Date of Patent: Jan. 16, 2007

(54) OPTICAL DISK DEVICE

(75) Inventor: Toru Mikami, Tokorozawa (JP)

(73) Assignee: Teac Corporation, Musashino (JP)

( * ) Notice: Subject to any disclaimer, the term of this patent is extended or adjusted under 35 U.S.C. 154(b) by 830 days.

(21) Appl. No.: 10/254,715

(22) Filed: Sep. 25, 2002

(65) Prior Publication Data

US 2003/0067849 A1   Apr. 10, 2003

(30) Foreign Application Priority Data

Sep. 28, 2001   (JP) .............................. 2001-303719

(51) Int. Cl.
*G11B 7/00* (2006.01)
(52) U.S. Cl. ............... 369/44.28; 369/44.26; 369/47.27
(58) Field of Classification Search ............. 369/44.28, 369/44.29, 44.27, 44.26, 275.3, 47.1, 47.28, 369/44.41
See application file for complete search history.

(56) References Cited

U.S. PATENT DOCUMENTS 6,118,752 A * 9/2000 Miyagawa et al. ...... 369/275.3
6,459,664 B1 * 10/2002 Yamada et al. .......... 369/44.32
6,597,642 B1 * 7/2003 Ijima et al. ............... 369/44.11

FOREIGN PATENT DOCUMENTS

| JP | 1027036 | 1/1989 |
|---|---|---|
| JP | 2000-187860 | 4/2000 |
| JP | 2001-1034941 | 2/2001 |
| JP | 2001-093242 | 4/2001 |
| JP | 2002-352448 | 12/2002 |
| JP | 2002-358666 | 12/2002 |

* cited by examiner

*Primary Examiner*—Nabil Hindi
(74) *Attorney, Agent, or Firm*—Christensen O'Connor Johnson Kindness PLLC (57) ABSTRACT

An optical disk device in which data is written to or reproduced from an optical disk having an area which contains a header section and another area which does not contain a header section. When a track deviation of an optical pickup occurs, it is detected whether or not a signal representing the header section is contained in the return light signal from the optical disk. When a signal representing the header section is contained in the return light signal, it is determined that the optical pickup is located in an area which contains a header section and tracking is controlled through a push-pull method etc. On the other hand, when a signal representing the header section is not contained in the return light signal from the optical pickup, it is determined that the optical pickup is located in an area which does not contain a header section and tracking is controlled through differential phase detection etc.

15 Claims, 7 Drawing Sheets

OPTICAL DISK DEVICE

BACKGROUND OF THE INVENTION

1. Field of the Invention

The present invention relates to an optical disk device, and in particular, to a recovery process from a track deviation.

2. Description of the Related Art

In an optical disk, tracking is controlled so that data can be written or reproduced while laser light is irradiated on an approximate center area of an information recording track. More specifically, an amount of return laser light from an optical disk is detected, a variation in the amount of return light corresponding to the displacement from the approximate center of the track is detected as a tracking error signal, and an optical pickup is driven along the radial direction of the optical disk by a servo system based on the tracking error signal. Various methods are known for controlling the tracking including a three-spot method, push-pull method, difference push-pull method, and DPD (Differential Phase Detection).

Figure 8A:
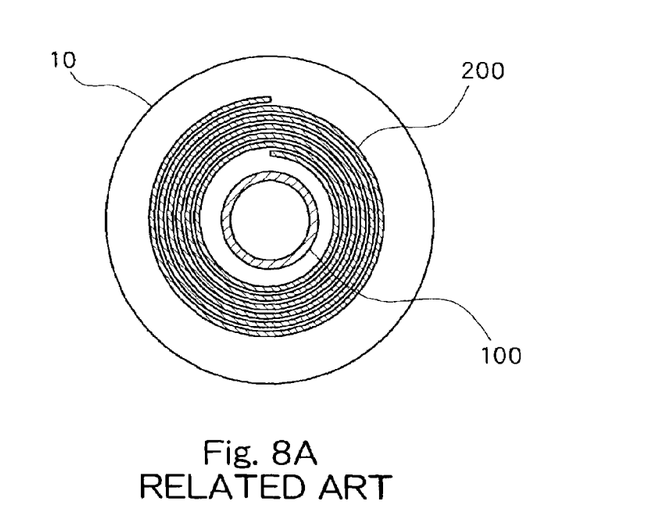
FIG. 8A is a diagram for explaining an emboss data zone and a rewritable data zone in a DVD-Ram.
Figure 8B:
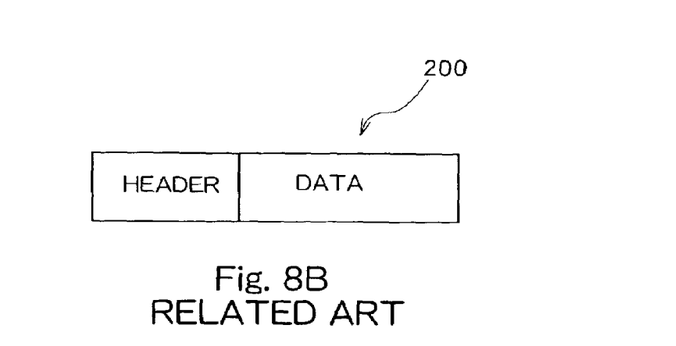
FIG. 8B is a diagram for explaining a format of the rewritable data zone.
Figure 8C:
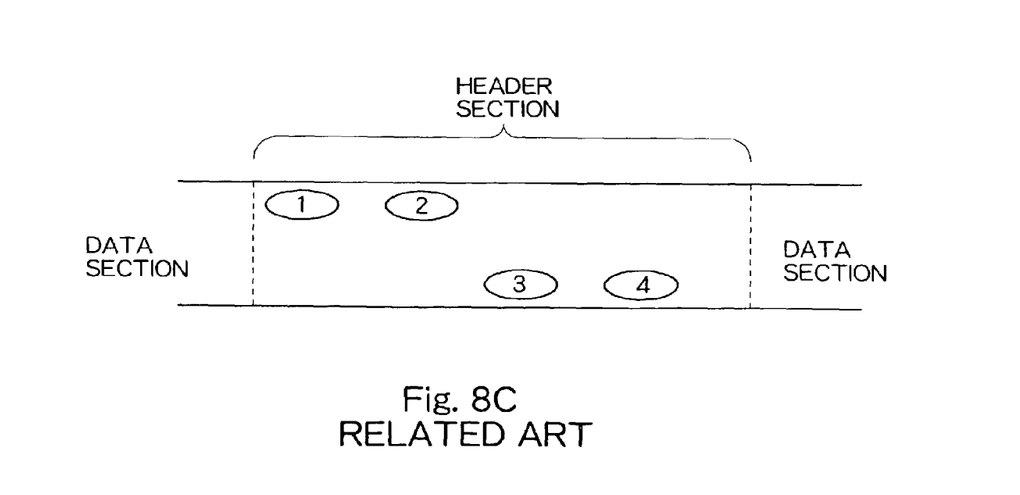
FIG. 8C is a diagram for explaining a header section shown in FIG. 8B.

On the other hand, in a DVD-RAM, as shown in FIG. 8A, there are two zones, a read-only emboss data zone 100, in which information about the disk is formed in advance as pits, and a rewritable data zone 200, onto which data can be written. Because these two areas (zones) have different optical characteristics, different methods are employed for controlling the tracking. As shown in FIG. 8B, each sector in the rewritable data zone 200 comprises a header section and a data section, and 4 address information are formed on the header section as shown in FIG. 8C.

Even when two areas 100 and 200 are present as described above, in general, if a seek destination region is known, tracking can be controlled by determining a tracking control method for the seek destination region. For example, it is possible to transport an optical pickup to the innermost track and control the tracking using the setting for the emboss data zone, and, when seeking into the rewritable data zone, to switch off the tracking control for the emboss data zone, transport the optical pickup, and switch into a tracking control method for the rewritable data zone to control tracking.

As described, when it is known whether the optical pickup is located in the emboss data zone 100 or in the rewritable data zone 200, it is possible to set the tracking control method corresponding to the region. However, when seeking of the optical pickup is effected through DC motor control, for example, it is not possible to detect where the optical pickup is, that is, it is not possible to detect the absolute position of the optical pickup unless the address can be reproduced. In a mechanism in which seeking is effected through DC motor control, when a track deviation occurs due to disturbances such as shock, it is not possible to recognize the current position of the optical pickup, and therefore, it is not possible to determine whether the tracking control method for emboss data zone should be used for controlling the tracking or the tracking control method for rewritable data zone should be used for controlling the tracking, requiring a longer period of time for recovery. More specifically, in the above described case, tracking control may be continued by, for example, attempting to control the tracking through the tracking control method which was executed before the track deviation and switching to the other tracking control method when the track deviation cannot be resolved, or, by transporting the optical pickup to the innermost track, controlling the tracking using the tracking control method for emboss data zone 100, and then the seeking can be effected. In both examples, some amount of time is required before recovery.

SUMMARY OF THE INVENTION

Accordingly, an object of the present invention is to provide an optical disk device in which on-track state of an optical pickup can be quickly recovered even when track deviation occurs in the optical pickup.

In order to achieve at least the object mentioned above, according to one aspect of the present invention, there is provided an optical disk device comprising means for irradiating laser light onto an optical disk; means for detecting return light from the optical disk; means for detecting track deviation of the laser light; header section signal detecting means for detecting a signal representing header section of the optical disk from the return light signal when the track deviation is detected; and means for controlling tracking through a first tracking control method when the header section signal detecting means detects the signal representing the header section and through a second tracking control method different from the first tracking control method when the header section signal detecting means does not detect the signal representing the header section.

According to another aspect of the present invention, it is preferable that, in the optical disk device, the first tracking control method is a control method for a zone, in the optical disk, which contains a header section, and the second tracking control method is a control method for a zone, in the optical disk, which contains no header section.

According to another aspect of the present invention, it is preferable that, in the optical disk device, the first tracking control method is a control method for a rewritable data zone, in the optical disk, which contains a header section, and the second tracking control method is a control method for an emboss data zone, in the optical disk, which contains no header section. According to another aspect of the present invention, it is preferable that, in the optical disk device, the first tracking control method is, for example, a push-pull method, and the second tracking control method is, for example, differential phase detection.

According to another aspect of the present invention, there is provided an optical disk device comprising an optical pickup for irradiating laser light onto an optical disk and for detecting return light from the optical disk; means for detecting track deviation of the laser light; header section signal detecting means for detecting a signal representing a header section of the optical disk from the return light signal when the track deviation is detected; and means for detecting position of the optical pickup in the optical disk based on whether or not the signal representing the header section is detected by the header section signal detecting means.

According to a further aspect of the present invention, it is preferable that, in the optical disk device, when the header section signal detecting means detects the signal representing the header section, the means for detecting position detects that the optical pickup is located in a first area, in the optical disk, which contains a header section, and when the header section signal detecting means does not detect the signal representing the header section, the means for detecting position detects that the optical pickup is located in a second area, in the optical disk, which does not contain the header section.

According to yet another aspect of the present invention, it is preferable that, in the optical disk device, when the header section signal detecting means detects the signal representing the header section, the means for detecting position detects that the optical pickup is located in a rewritable data zone in the optical disk, and when the header section signal detecting means does not detect the signal representing the header section, the means for detecting position detects that the optical pickup is located in an emboss data zone in the optical disk.

According to the present invention, when a track deviation occurs, the position of the optical pickup within the optical disk is detected by determining whether or not a signal representing a header section is contained in the return light signal and a tracking control method suitable for the detected position is employed for controlling the tracking. For example, in a DVD-RAM, an emboss data zone 100 which does not contain a header section and a rewritable data zone 200 which contains a header section are present. When a signal representing the header section is contained in the return light signal, it is possible to determine that the optical pickup is located in the rewritable data zone. In this case, a tracking control method for a rewritable data zone, for example, a push-pull method (including a differential push-pull method) is employed to return the optical pickup to the on-track state.

The present invention is typically applied to a DVD-RAM, but may also be applied to any drive for driving an optical disk having an area which has a header section and another area which does not have a header section.

While the present invention will be more clearly understood with reference to the following embodiments, the scope of the present invention is not limited to the embodiments.

DESCRIPTION OF PREFERRED EMBODIMENTS

Preferred embodiments of the present invention will now be described with reference to the drawings with a DVD-RAM drive as an example.

Figure 1:
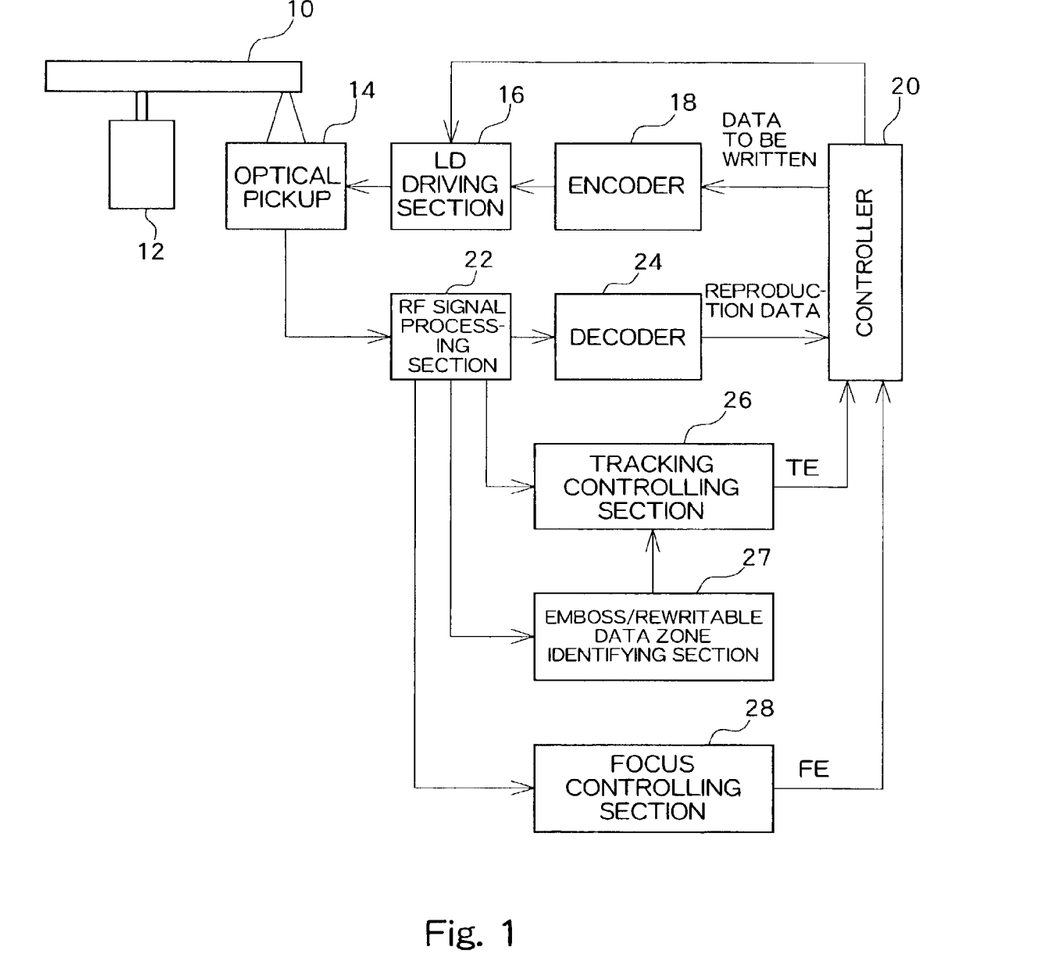
FIG. 1 is a structural block diagram of an optical disk device.

FIG. 1 is a block diagram showing a structure of an optical disk device according to the present embodiment.

An optical disk 10 is rotationally driven by a spindle motor 12 through a CAV (or CLV) method.

An optical pickup 14 is placed to oppose the optical disk 10, and irradiates laser light of a writing power onto the optical disk 10 to write data and laser light of a reproducing power onto the optical disk 10 to reproduce written data. During the writing process, data to be written which is supplied from the controller 20 is modulated by an encoder 18 and is converted into a driving signal by an LD driving section 16. A laser diode (LD) of the optical pickup 14 is driven by the driving signal. During the reproducing process, a four-segment photodetectors within the optical pickup 14 converts the amount of return light into an electrical signal, and the converted electrical signal is supplied to an RF signal processing section 22 and is demodulated by a decoder 24. Then, the signal is supplied to the controller 20 as the reproduced data.

The RF signal processing section 22 comprises an amplifier, an equalizer, a binarizing section, and a PLL section, and boosts and binarizes an RF signal, generates a synchronous clock, and outputs both signals to the decoder 24.

A tracking controlling section 26 generates a tracking error signal TE from a reproduced RF signal and supplies the tracking error signal TE to the controller 20. The tracking controlling section 26 generates a tracking error signal while switching between a tracking control method for the emboss data zone 100 and a tracking control method for the rewritable data zone 200. As the tracking control method for the emboss data zone 100, for example, DPD (differential phase detection) maybe employed in which the tracking error signal is generated by calculating a phase difference between signals from detectors split into two components along the radial direction of the optical disk 10, in consideration of the fact that emboss data zone 100 is relatively flat because no groove is formed in the emboss data zone 100. As the tracking control method for the rewritable data zone 200, for example, a push-pull method may be employed in which the tracking error signal is generated by calculating the level difference between signals from detectors split into two components along the radial direction of the optical disk. The determination of which one of the two tracking control method is to be used is made based on a signal from an emboss/rewritable data zone identifying section 27. In the present embodiment, the tracking servo function is provided in the controller 20 for the purpose of explanation, but it is also possible to provide a tracking servo circuit separately from the controller 20 and to supply the tracking error signal TE to the tracking servo circuit.

A focus controlling section 28 generates a focus error signal FE from the reproduced RF signal and supplies the focus error signal FE to the controller 20. Similar to the tracking control, it is also possible to provide a focus servo circuit separately from the controller 20 and to supply the focus error signal FE to the focus servo circuit.

The emboss/rewritable data zone identifying section 27 detects a signal representing header section contained in the reproduced RF signal and supplies the detection signal to the tracking controlling section 26.

Figure 2:
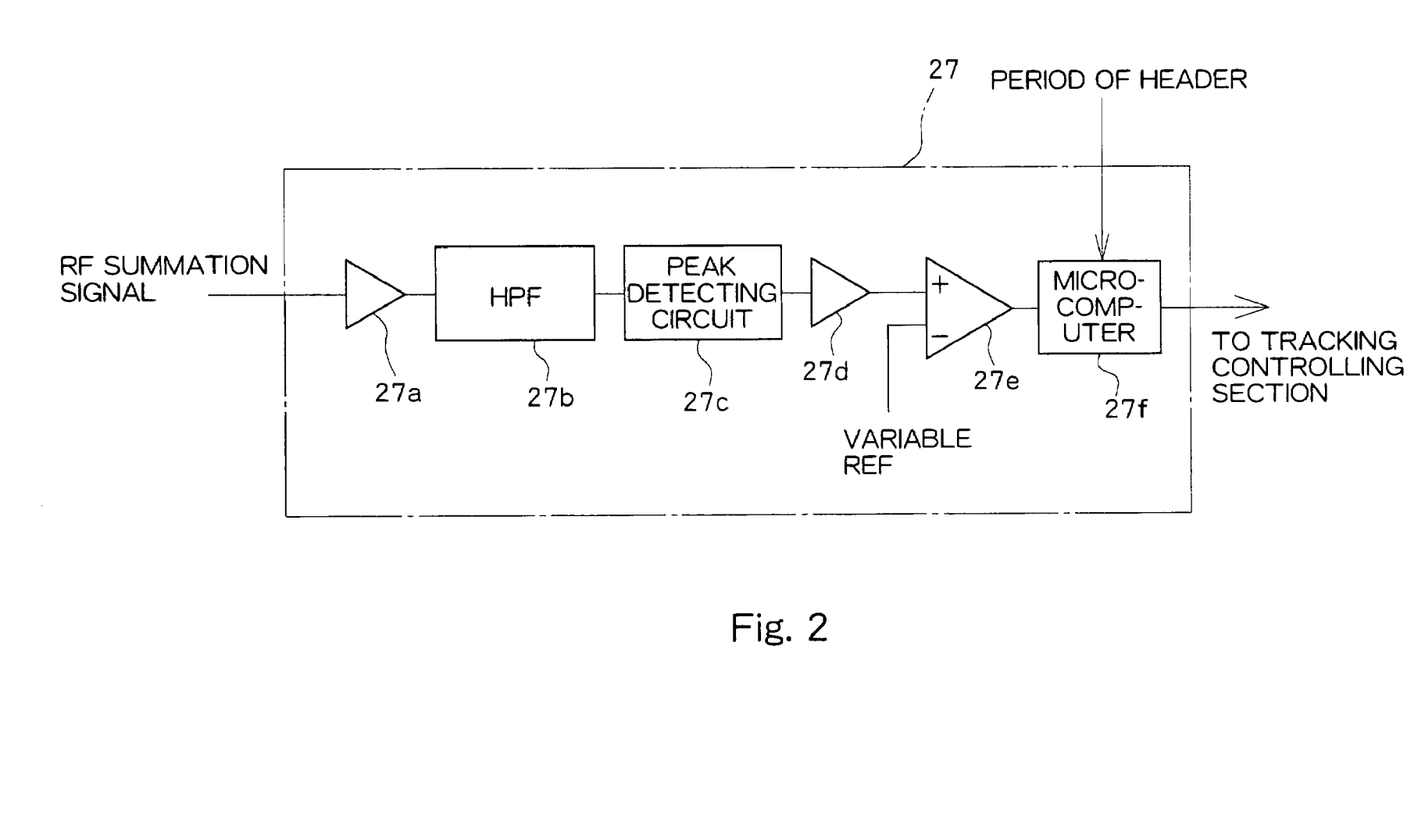
FIG. 2 is a diagram showing a structure of an emboss/rewritable data zone identifying section shown in FIG. 1.

FIG. 2 is a block diagram showing a structure of the emboss/rewritable data zone identifying section 27 shown in FIG. 1. The emboss/rewritable data zone identifying section 27 comprises an amplifier 27a, a high pass filter (HPF) 27b, a peak detecting circuit 27c, an amplifier 27d, a comparator 27e, and a microcomputer 27f.

An RF summation signal from the RF signal processing section 22, that is, the summation signal of four signals from the four-segment photodetectors in the optical pickup 14 is supplied to the amplifier 27a. The amplifier 27a amplifies the RF summation signal with a predetermined gain and supplies the amplified signal to the high pass filter (HPF) 27b.

The HPF 27b absorbs the DC offset component of the RF summation signal and supplies the resulting signal to the peak detecting circuit 27c.

The peak detecting circuit 27c detects the peak envelope of the input RF summation signal and supplies the detected peak envelope to the amplifier 27d. The amplifier 27d amplifies the peak envelope signal with a predetermined gain and supplies the amplified signal to the comparator 27e.

At the comparator 27e, the peak envelope signal from the amplifier 27d is input to the non-inverting input terminal (+) and a reference (variable ref) voltage which is set to an appropriate value is input to the inverting input terminal (−). The comparator 27e compares these two signals and outputs a binarized signal. The variable ref is set at a value slightly above the average level of the peak envelop signal in order to detect only the header signal contained in the peak envelope.

The detected binarized signal from the comparator 27e is a pulse-like signal, and thus cannot be used to instruct tracking operations in the tracking controlling section 26 without further processing. Therefore, the shape of the binarized signal must be adjusted. For this purpose, noise removal and review of the pulse are executed by the microcomputer 27f, and it is desirable that a signal for identifying the emboss data zone 100 and the rewritable data zone 200 be output as the result.

Figure 3:
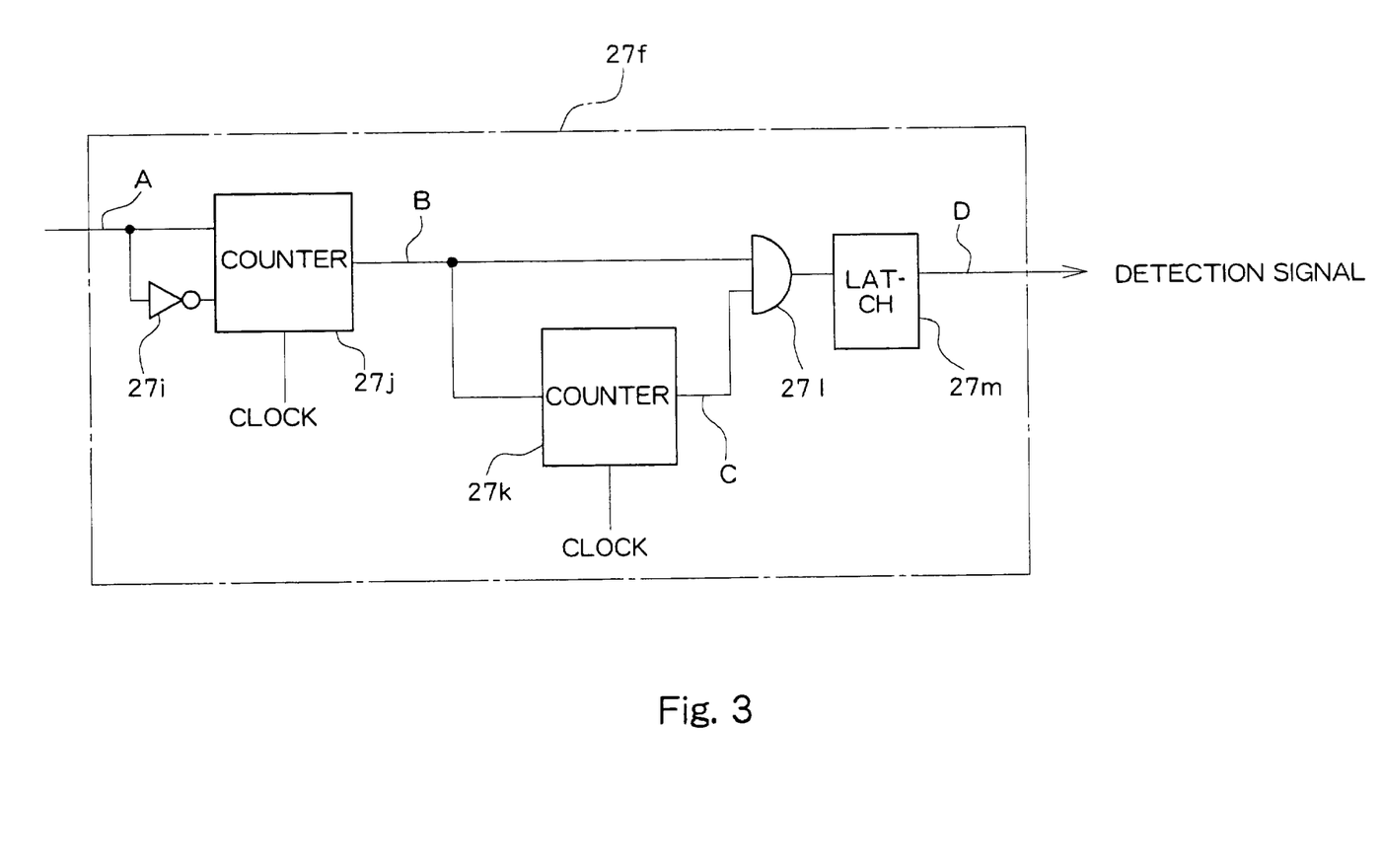
FIG. 3 is a diagram showing a structure of a microcomputer shown in FIG. 2.
Figure 4A:
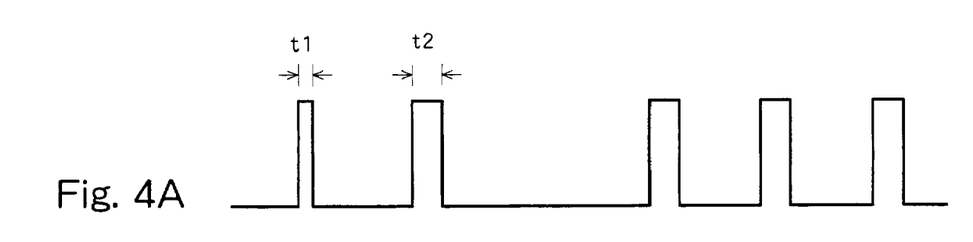
FIGS. 4A, 4B, 4C, and 4D are timing charts for signals in each section of the microcomputer shown in FIG. 2.
Figure 4B:
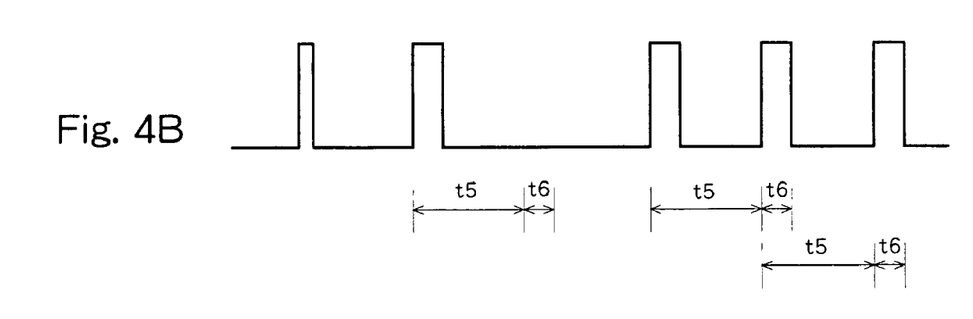

FIG. 3 is a functional block diagram of the microcomputer 27f shown in FIG. 2. First, a pulse from the comparator 27e and a signal which is obtained by inverting the pulse from the comparator 27e by an inverting amplifier 27i are supplied to a first counter 27j. The first counter 27j starts counting the clock upon receiving a pulse from the comparator 27e and resets the counting operation upon receiving the inverted signal from the inverting amplifier 27i. FIG. 4A shows an example binarized signal from the comparator 27e. FIG. 4B shows a corresponding output from the counter 27j. Noise in which the width of the pulse does not exceed a predetermined value such as, for example, noise having a pulse width of t1, is removed.

Figure 4C:
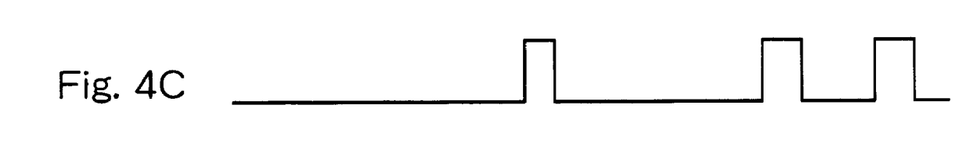
Figure 4D:
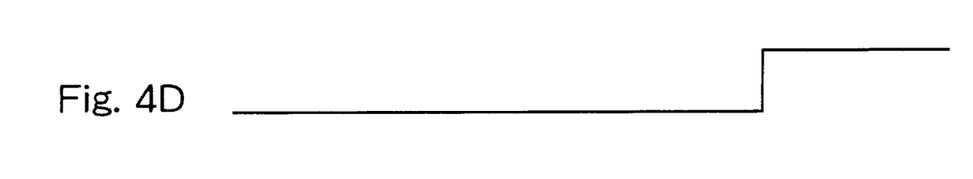

The signal from the first counter 27j is supplied to a second counter 27k and to an AND gate 27l. The signal from the second counter 27k is supplied to the other terminal of the AND gate 27l. The second counter 27k generates a window pulse having a predetermined width in time (t6) after a predetermined amount of time (t5) has elapsed after a pulse is inputted. FIG. 4C shows a train of window pulses from the second counter 27k. The AND gate 27l determines whether or not the pulse fits within the window pulse and supplies the result to a latch 27m. In this manner, noise that does not match the timing of the window pulse generated by the second counter 27k can be removed, and the signal from which the noise has been removed is output as a continuous signal by the latch 27m. FIG. 4D shows the output signal from the latch 27m, that is, the output signal from the microcomputer 27f. The example shown in FIGS. 4A–4D is an example in the rewritable data zone 200, and, for the emboss data zone 100, the signal from the latch 27m would be at zero level.

The detection signal from the microcomputer 27f is supplied to the tracking controlling section 26 as described above. The tracking controlling section 26 selects a tracking control method based on the signal from the emboss/rewritable data zone identifying section 27. More specifically, when a signal representing header section is detected, the tracking controlling section 26 judges that the optical pickup 14 is located in the rewritable data zone 200 and controls the tracking through the push-pull method. On the other hand, when the signal representing header section is not detected, the tracking controlling section 26 judges that the optical pickup 14 is located in the emboss data zone 100 and controls the tracking through DPD.

Figure 5:
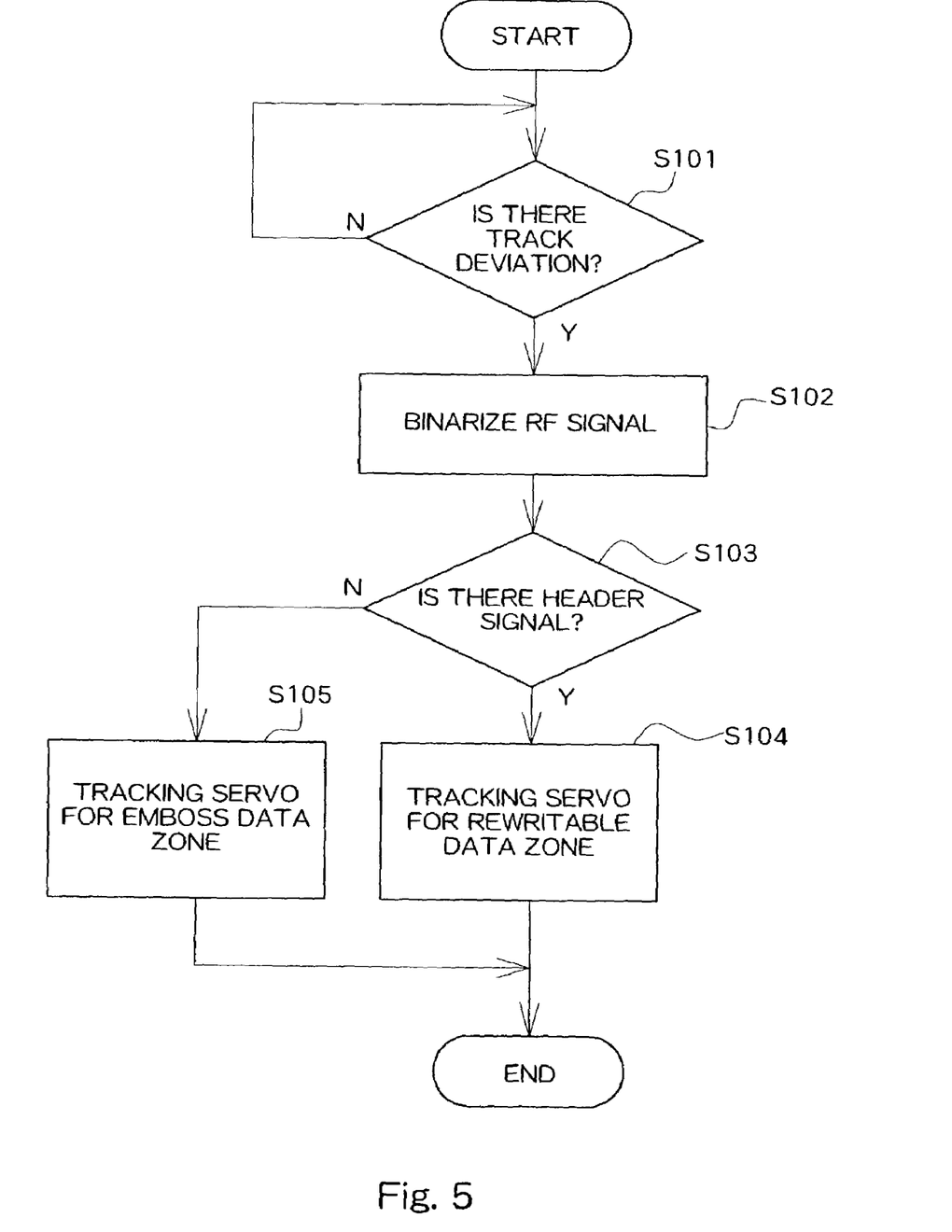
FIG. 5 is a flowchart showing a process in a preferred embodiment.

FIG. 5 shows a process flowchart for the present embodiment. First, it is determined whether or not a track deviation is generated while writing or reproducing data in the emboss data zone 100 or the rewritable data zone 200 (step S101). The determination of whether or not a track deviation is generated can be made by the controller 20 based on the variation in the tracking error signal TE. When a track deviation occurs, the emboss/rewritable data zone identifying section 27 binarizes an RF summation signal from the RF signal processing section 22 (step S102) and judges whether or not a signal representing header section is present based on the binarized signal (step S103). When there is a signal representing the header section, it is determined that the optical pickup 14 is located in the rewritable data zone 200 and the tracking controlling section 26 switches to the push-pull method for the rewritable data zone 200 and resolves the track deviation (step S104). When, on the other hand, it is determined in step S103 as "NO", that is, when a signal representing the header section is not detected, it is determined that the optical pickup 14 is located in the emboss data zone 100, and the tracking controlling section 26 switches to DPD for the emboss data zone 100 and resolves the track deviation (step S105). In this manner, because the tracking control method is determined based on the detection result of the current location of the optical pickup 14 after the track deviation, it is not necessary to execute the control method immediately before the occurrence of the track deviation or to transport the optical pickup 14 to the innermost track of the optical disk, and thus, it is possible to quickly and reliably recover the on-track state.

Figure 6A:
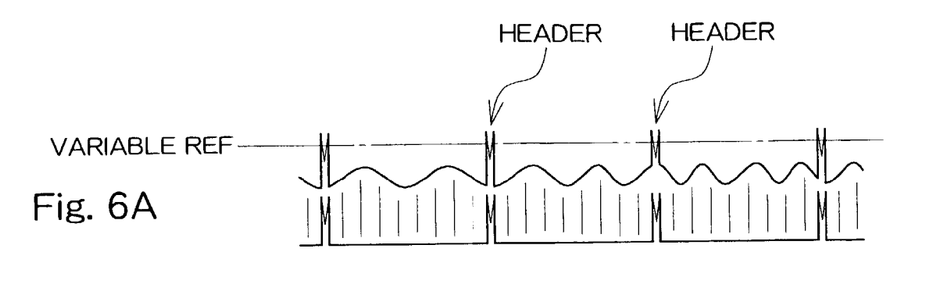
FIG. 6A is a diagram for explaining a relationship between an RF signal and a threshold value (variable ref) in a rewritable data zone.
Figure 6B:
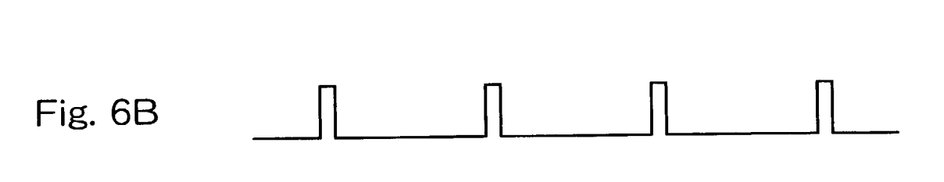
FIG. 6B is a timing chart for a signal obtained by binarizing the RF signal shown in FIG. 6A.

FIGS. 6A, 6B, 7A, and 7B show processing of the RF summation signal in the present embodiment. FIG. 6A shows a waveform of an RF summation signal when a track deviation is generated in a focused state and the optical pickup 14 is caused to move to the rewritable data zone 200. In the rewritable data zone 200, as shown in FIGS. 8B and 8C, a header section onto which four items of address information are formed is provided for each sector. Because of this, in the RF summation signal, a signal representing the header section (address signal) is superimposed in the RF summation signal. Therefore, by comparing the peak envelope of the RF signal and a variable ref (represented by a one-dotted chain line in FIG. 6A) and binarizing the signal using the variable ref signal, it is possible to extract the signal representing the header section as shown by the binarized signal of FIG. 6B.

Figure 7A:
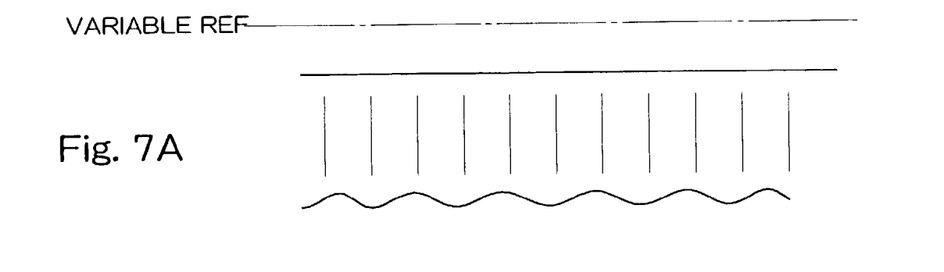
FIG. 7A is a diagram for explaining a relationship between an RF signal and a threshold value in an emboss data zone.
Figure 7B:
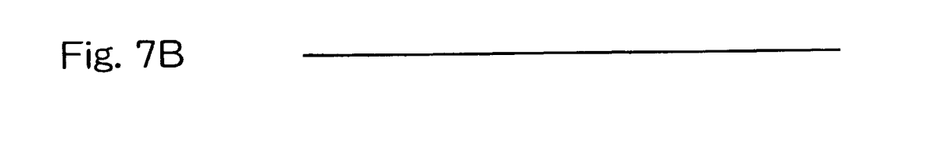
FIG. 7B is a timing chart of a signal obtained by binarizing the RF signal shown in FIG. 7A.

On the other hand, FIG. 7A shows a waveform of the RF summation signal when a track deviation is generated in a focused state and the optical pickup 14 is caused to move to the emboss data zone 100. Because no header section is formed in the emboss data zone 100 unlike the rewritable data zone 200, the RF summation signal does not contain the signal representing header section. Therefore, when the peak envelope signal is binarized using the variable ref signal, the binarized signal would become a constant as shown in FIG.

7B, and thus, it is possible to detect that there is no signal representing the header section.

There may be cases in which, even though the optical pickup 14 is located in the emboss data zone 100, the noise level exceeds a threshold value and is erroneously detected as the signal representing the header section.

To this end, it is possible to detect, at the microcomputer 27f, the period of the binarized signal from the comparator 27e and to compare the period of the binarized signal with a predetermined period of the header section supplied from the controller 20 (refer to FIG. 2), to thereby determine whether or not the extracted signal representing the header section is truly a signal corresponding to the header section. It is therefore possible to determine that the optical pickup 14 is located in the rewritable data zone only when it is determined that the signal is a true signal representing the header section, and to switch to the tracking control method for the rewritable data zone only when such a determination is made.

Preferred embodiments of the present invention have been described. However, the present invention is not limited to the described embodiments, and various modifications can be made.

For example, in the present embodiment, presence of the signal representing the header section is detected using the RF summation signal. However, the present invention is not limited to such a configuration, and the presence of the signal representing the header section can be determined by processing an RF difference signal, that is, a difference signal between two signals from photodetectors split into two components along the radial direction of the optical disk.

Moreover, the structure of the emboss/rewritable data zone identifying section 27 shown in FIGS. 2 and 3 is only exemplary and any other circuit structure can be used which extracts a signal representing the header section which is contained in the RF signal. In addition to the extraction of the signal representing the header section by examining the signal level as in the present embodiment, it is possible to extract the signal representing header section by examining the frequency of the signal representing header section. Furthermore, even when the structure shown in FIG. 2 is employed, it is possible to provide a damper or an inverting amplifier between the amplifier 27a and the HPF 27b, as necessary. Alternatively, it is possible to provide a switch and to switch whether or not inversion in the inverting amplifier should be executed as necessary. It is also possible to employ a structure in which the non-inverting input and the inverting input of the comparator 27e are reversed with respect to the structure of FIG. 2.

In addition, in the present embodiment, DPD is employed for the emboss data zone 100 and the push-pull method is employed for the rewritable data zone 200, but the present invention is not limited to such a configuration, and it is possible to employ the present invention similarly in cases where other tracking control methods are employed for the emboss data zone 100 and for the rewritable data zone 200.

What is claimed is:

1. An optical disk device comprising:
 means for irradiating laser light onto an optical disk;
 means for detecting return light from said optical disk;
 means for detecting track deviation of said laser light;
 header section signal detecting means for detecting a signal representing a header section of said optical disk from the return light signal when said track deviation is detected; and
 means for controlling tracking through a first tracking control method when said header section signal detecting means detects said signal representing the header section and through a second tracking control method different from said first tracking control method when said header section signal detecting means does not detect said signal representing the header section.

2. An optical disk device according to claim 1, wherein said first tracking control method is a control method for a zone, in said optical disk, which contains a header section; and
 said second tracking control method is a control method for a zone, in said optical disk, which contains no header section.

3. An optical disk device according to claim 1, wherein said first tracking control method is a control method for a rewritable data zone, in said optical disk, which contains a header section; and
 said second tracking control method is a control method for an emboss data zone, in said optical disk, which contains no header section.

4. An optical disk device according to claim 1, wherein said first tracking control method is a control method for a zone, in said optical disk, which contains a header section and in which a groove is formed; and
 said second tracking control method is a control method for a zone, in said optical disk, which contains no header section and in which no groove is formed.

5. An optical disk device according to claim 1, wherein said first tracking control method is a push-pull method; and
 said second tracking control method is a differential phase detection.

6. An optical disk device according to claim 1, wherein said header section signal detecting means comprises:
 means for detecting a peak envelope of the return light signal; and
 means for extracting said signal representing the header section by comparing said peak envelope with a predetermined threshold value.

7. An optical disk device according to claim 6, wherein said header section signal detecting means further comprises means for determining whether or not the period of said extracted signal representing the header section is equal to a predetermined period; and
 said header section signal detecting means detects only a signal representing the header section having said predetermined period.

8. An optical disk device comprising:
 an optical pickup for irradiating laser light onto an optical disk and for detecting return light from said optical disk;
 means for detecting track deviation of said laser light;
 header section signal detecting means for detecting a signal representing a header section of said optical disk from the return light signal when said track deviation is detected; and
 means for detecting position of said optical pickup in said optical disk based on whether or not said signal representing the header section is detected by said header section signal detecting means, wherein
 when said header section signal detecting means detects said signal representing the header section, said means for detecting position detects that said optical pickup is located in a first area, in said optical disk, which contains a header section, and when said header section signal detecting means does not detect said signal representing the header section, said means for detecting position detects that said optical pickup is located in a second area, in said optical disk, which contains no header section.

9. An optical disk device according to claim 8, wherein
when said header section signal detecting means detects said signal representing the header section, said means for detecting position detects that said optical pickup is located in a rewritable data zone in said optical disk; and
when said header section signal detecting means does not detect said signal representing the header section, said means for detecting position detects that said optical pickup is located in an emboss data zone in said optical disk.

10. An optical disk device comprising:
an optical pickup for irradiating laser light onto an optical disk and for detecting return light from said optical disk;
a tracking error detecting circuit for detecting track deviation of said laser light using the return light signal from said optical pickup;
a header section signal detecting circuit for detecting a signal representing a header section of said optical disk contained in the return light signal from said optical pickup; and
a tracking controlling circuit for allowing recovery of an on-track state of said optical pickup from said track deviation state through a first tracking control method when said header section signal detecting circuit detects said signal representing the header section, and through a second tracking control method which differs from said first tracking control method when said header section signal detecting circuit does not detect said signal representing the header section.

11. An optical disk device according to claim 10, wherein
when said header section signal detecting circuit detects said signal representing the header section, an on-track state of said optical pickup is recovered from said track deviation state by said tracking controlling circuit through a tracking control method preset for a rewritable data zone in said optical pickup; and
when said header section signal detecting circuit does not detect said signal representing the header section, an on-track state of said optical pickup is recovered from said track deviation state by said tracking controlling circuit through a tracking control method preset for an emboss data zone in said optical disk.

12. An optical disk device according to claim 10, wherein
when said header section signal detecting circuit detects said signal representing the header section, an on-track state of said optical pickup is recovered from said track deviation state by said tracking controlling circuit through a push-pull method; and
when said header section signal detecting circuit does not detect said signal representing the header section, an on-track state of said optical pickup is recovered from a track deviation state by said tracking controlling circuit through a differential phase detection.

13. An optical disk device according to claim 10, wherein said header section signal detecting circuit comprises:
  a high pass filter taking said return light signal as its input;
  a peak detecting circuit, taking a signal from said high pass filter as its input, for detecting a peak envelope of said input signal; and
  a comparator for comparing the level of said peak envelope and a threshold value and outputting a binarized signal.

14. An optical disk device according to claim 13, wherein said header section signal detecting circuit further comprises a processing circuit for adjusting the waveform of a binarized signal from said comparator and for outputting said signal representing the header section.

15. An optical disk device according to claim 14, wherein said processing circuit only outputs a signal representing the header section which has a predetermined period.

* * * * *

UNITED STATES PATENT AND TRADEMARK OFFICE
CERTIFICATE OF CORRECTION

PATENT NO.         : 7,164,628 B2                                      Page 1 of 1
APPLICATION NO.    : 10/254715
DATED              : January 16, 2007
INVENTOR(S)        : T. Mikami It is certified that error appears in the above-identified patent and that said Letters Patent is hereby corrected as shown below:

| COLUMN | LINE | ERROR |
|---|---|---|
| (73) Pg. 1, col. 1 | Assignee | "Teac Corporation," should read --TEAC Corporation,-- |
| (56) Pg. 1, col. 2 | Refs. Cited (Foreign Pats., Item 2) | "4/2000" should read --7/2000-- |
| (56) Pg. 1, col. 2 | Refs. Cited (Foreign Pats., Item 3) | "2001-1034941" should read --2001-034941-- |

Signed and Sealed this

Tenth Day of July, 2007

JON W. DUDAS
*Director of the United States Patent and Trademark Office*